US008346862B2

(12) United States Patent
Kraft et al.

(10) Patent No.: US 8,346,862 B2
(45) Date of Patent: Jan. 1, 2013

(54) MOBILE COMMUNICATION TERMINAL AND METHOD

(75) Inventors: Christian Kraft, Frederiksberg (DK); Peter Dam Nielsen, Kgs. Lyngby (DK)

(73) Assignee: Nokia Corporation

( * ) Notice: Subject to any disclaimer, the term of this patent is extended or adjusted under 35 U.S.C. 154(b) by 1156 days.

(21) Appl. No.: 11/116,958

(22) Filed: Apr. 28, 2005

(65) Prior Publication Data

US 2006/0248149 A1 Nov. 2, 2006

(51) Int. Cl.
G06F 15/16 (2006.01)
(52) U.S. Cl. ......... 709/204; 709/205; 709/206; 715/758
(58) Field of Classification Search ................ 709/205, 709/204, 206; 715/758
See application file for complete search history.

(56) References Cited

U.S. PATENT DOCUMENTS

| | | | | |
|---|---|---|---|---|
| 6,981,021 | B2* | 12/2005 | Takakura et al. | 709/204 |
| 7,411,939 | B1* | 8/2008 | Lamb et al. | 370/352 |
| 2003/0140145 | A1* | 7/2003 | Lindberg et al. | 709/227 |
| 2003/0147512 | A1 | 8/2003 | Abburi | |
| 2003/0210265 | A1* | 11/2003 | Haimberg | 345/758 |
| 2004/0015547 | A1* | 1/2004 | Griffin et al. | 709/204 |
| 2004/0141508 | A1* | 7/2004 | Schoeneberger et al. | 370/401 |
| 2005/0071767 | A1 | 3/2005 | Kirkland | |
| 2005/0102358 | A1* | 5/2005 | Gold et al. | 709/204 |
| 2005/0262542 | A1* | 11/2005 | DeWeese et al. | 725/106 |
| 2006/0242232 | A1* | 10/2006 | Murillo et al. | 709/204 |

FOREIGN PATENT DOCUMENTS

| | | |
|---|---|---|
| EP | 0 981 252 A2 | 2/2000 |
| EP | 1 248 486 A2 | 10/2002 |
| EP | 1 331 786 A1 | 7/2003 |
| EP | 1331786 | 7/2003 |
| WO | WO 01/93047 A1 | 12/2001 |
| WO | WO 2004/049681 A1 | 6/2004 |

OTHER PUBLICATIONS

"Nokia 3310 Phone Features", http://www.nokia.com/nokia/0,8764,2236,00.html, Apr. 26, 2005, pp. 1-3.

(Continued)

Primary Examiner — David Lazaro
Assistant Examiner — Marie Georges Henry
(74) Attorney, Agent, or Firm — Alston & Bird LLP

(57) ABSTRACT

The present invention relates to methods for sending and receiving sound based messages in an efficient way between one or several mobile communication terminals, a mobile communication terminal, a computer program, and a system and method for handling an audio messaging service (AMS) chat session between mobile communication apparatuses. The methods for sending and receiving comprises steps for handling AMS chat sessions in the mobile communication apparatus. The mobile communication comprises means for handling AMS chat sessions. The system comprises means for handling AMS in a network; a server; and mobile communication apparatuses accessing the server, wherein the mobile communication apparatuses are adapted to send a request for participating in an AMS chat session to the server, and the server is arranged to provide an AMS message for the mobile communication apparatuses, to update the AMS message from the mobile communication apparatuses, and to transmit the updated AMS message to the mobile communication apparatuses participating in the chat session. The method for handling an audio messaging service AMS chat session between mobile communication apparatuses comprises steps for handling AMS chat sessions in the system.

54 Claims, 10 Drawing Sheets

OTHER PUBLICATIONS

"Push to Talk Over Cellular, Increasing mobile penetration in low income segments", Nokia, pp. 1-2.
"Short Audio Messaging, New low cost voice communication service", Nokia, pp. 1-2.
Canadian Office Action dated Oct. 26, 2009.
International Search Report and Written Opinion for International Application No. PCT/IB2006/000938, mailed Aug. 14, 2006.
Nokia Xpress Audio Messaging; "Creating new revenue from existing MMS assets"; [Online]; [Retrieved on Oct. 7, 2006]; Retrieved from the Internet: URL: http://www.nokia.com/NOKIA_COM_1/About_Nokia/Press/Press_Events/zz_Nokia_Press_Conference_in_Cannes_page_69809/audiomessag ingdatasheet2.pdf>; 5 pages.
Nokia; "Bedienungshandbuch Nokia 6101"; [Online]; [Retrieved on Nov. 7, 2006]; Retrieved from the Internet: URL:http://ndsl.nokia.com/phones/files/guides/Nokia_6101_UG_de.pdf>; XP007900821; 153 pages.

* cited by examiner

MOBILE COMMUNICATION TERMINAL AND METHOD

TECHNICAL FIELD

The present invention relates to a method for sending and receiving sound based messages in an efficient way between one or several mobile communication terminals, a mobile communication terminal, a computer program, a system for handling an audio messaging service chat session between mobile communication apparatuses, and a method for handling an audio messaging service chat session between mobile communication apparatuses.

BACKGROUND ART

Sending short messages has because of its cheapness and efficiency become a popular way for mobile communication, and hence an important part of the mobile communication technology. Today, when the mobile communication technology has reached new parts of the world and new types of users, of which a not negliable part are illiterals, sound based messaging services has been developed. One of these is the so-called 'Short Audio Messaging', abbreviated SAM.

In the document 'Short Audio Messaging—New low cost voice communication service', published 2003 by Nokia Corporation and here incorporated by reference, a messaging service called Short Audio Messaging (SAM) is disclosed where audio clips are sent as messages.

This messaging service has nevertheless some drawbacks regarding the message handling, e.g. it is unhandy to communicate in groups and to handle longer conversations.

SUMMARY OF THE INVENTION

An object of the present invention is to provide an efficient sound based communication service for mobile communication terminals where a plurality of users can participate.

The above object is provided according to a first aspect of the present invention by a method for a audio messaging service (AMS) chat initiating mobile communication terminal comprising: defining at least one associated mobile communication terminal to participate in a AMS chat session; creating a AMS chat indicator; recording an audio message; creating a AMS message associated with said audio message; and transmitting said AMS chat indicator and said AMS message to said at least one associated mobile communication terminal.

An advantage of this is that the user of the initiating mobile communication terminal may send one AMS message to several mobile communication terminals simultaneously.

Another advantage of this is the AMS chat indicator, which may give the receiving mobile communication terminal an indication to enter a AMS chat mode.

The method of the above mentioned first aspect may further comprise: transmitting a AMS chat request to said at least one associated mobile communication terminal; receiving a AMS chat answer; and continuing said AMS chat session if said received AMS chat answer is positive.

An advantage with this is that the receiving mobile communication terminal may choose whether to participate or not in said AMS chat session.

In this first aspect of the present invention said received AMS chat answer may be a second AMS chat request associated with an existing second AMS chat session, further comprising: transmitting a second AMS chat answer; and entering said existing second AMS chat session if said transmitted AMS chat answer is positive.

An advantage with this is that, if the mobile communication terminal, to which said AMS message and said AMS indicator is sent, already participates in an existing AMS chat session when said AMS chat request is received, a second AMS chat request to join said existing AMS chat session may be sent to said initiating mobile communication terminal instead of a AMS chat answer regarding a new AMS chat session. In this way a more flexible and efficient chat solution is achieved.

In this first aspect of the invention, the AMS chat indicator may comprise a AMS chat session ID, and the method may further comprise: creating a new AMS chat session for every new session ID.

An advantage of this is that several AMS chat sessions may be in progress at the same time. The method of the above mentioned first aspect may further comprise: selecting sent AMS messages, or received AMS messages or any combination of these, from one of said one or several associated mobile communication terminals, for said AMS chat session; and presenting selected one or several AMS messages.

An advantage of this is that a specific AMS message in said AMS chat session may be easier to find.

Another advantage of this is that the user may configure the AMS message presentation of said AMS chat according to his or her preferences.

The method of the above mentioned first aspect may further comprise: selecting one or several sent AMS messages, or received AMS messages or any combination of these, from one of said one or several associated mobile communication terminals, for said AMS chat session; and playing said selected one or several AMS messages in said AMS chat session consecutively.

An advantage of this is that several AMS chat messages in a AMS chat session may be played with less user interaction and with fewer interruptions.

The method of the above mentioned first aspect may further comprise: selecting one or several sent AMS messages, or received AMS messages or any combination of these, from one of said one or several associated mobile communication terminals, for said AMS chat session; and deleting selected AMS messages.

An advantage of this is that AMS messages in a AMS chat session may be deleted in an efficient way.

The method of the above mentioned first aspect may further comprise: entering an existing AMS chat session; transmitting a AMS chat request concerning said AMS chat session to a mobile communication terminal; receiveing an answer from said mobile communication terminal; and adding said mobile communication terminal to said existing AMS chat session if said received answer is positive.

An advantage of this is that the initiating mobile communication terminal may invite a mobile communication terminal to join an existing AMS chat session.

The method of the above mentioned first aspect may further comprise: deleting an associated mobile communication terminal from said AMS chat session.

An advantage of this is that the initiating mobile communication terminal may remove a misbehaving participant from a AMS chat session.

The method of the above mentioned first aspect may further comprise: leaving said AMS chat session; and deleting AMS messages associated with said AMS chat session.

An advantage of this is that the memory handling in the mobile communication terminal is more efficient, since no old data is saved. It is also an advantage that this is made automatically when leaving the AMS chat session, since this does not require any user interaction.

The method of the above mentioned first aspect may further comprise: leaving said AMS chat session; and storing said AMS chat session internally, or externally on a storing device, or a combination of these.

An advantage of this is that a AMS chat session may be stored for later use. The session may be stored internally on the memory of the mobile commmunication terminal, which may imply fast access, or the session may be stored externally, which may imply possibilities to store large amounts of data, or a link for each AMS message, describing the path to the rest of the AMS message may be saved internally and the rest of the messages may be saved externally on a server, which may imply fast access to the links for each stored AMS message of the session, e.g. the headlines of the AMS messages, and a possibility to receive the AMS messages via the links.

The method of the above mentioned first aspect may further comprise: presenting existing AMS chat sessions; and selecting one or several of said many AMS chat sessions to participate in.

An advantage of this is that the user may easily survey and choose among existing AMS chat sessions.

The method of the above mentioned first aspect may further comprise: receiving a AMS message; playing said AMS message; and displaying an image associated with the sender of said AMS message.

An advantage of this is that a person with no reading skills may know from whom the AMS message is sent.

The method of the above mentioned first aspect may further comprise: determining a time for a AMS chat session to be held; and transmitting said time to an associated mobile communication terminal.

An advantage of this is that a AMS chat may be decided to be held in advance.

The method of the above mentioned first aspect may further comprise: determining a number of AMS messages in a AMS chat session; comparing said number of AMS messages in said AMS chat session with a maximum value of AMS messages in said AMS chat session; and deleting the first received, last received, first sent, or last sent AMS messages, or a combination of these in said AMS chat session until said number of AMS messages corresponds to said maximum value of AMS messages in said AMS chat session.

An advantage of this is that the memory of the mobile communiation terminal is handled in an efficient way, and since the messages is deleted gradually the memory does not risk to run short.

The method of the above mentioned first aspect may further comprise: setting said maximum value of AMS messages.

An advantage of this is that the user may configure the mobile communication terminal according to his or her preferences.

The method of the above mentioned first aspect may further comprise: receiving a first AMS message; entering a AMS playing mode automatically; and playing said first AMS message.

An advantage of this is that less user interaction is required, which is especially advantageous for users being busy with, e.g. driving a car.

The method of the above mentioned first aspect may further comprise: entering a AMS recording mode automatically; recording an audio message; creating a second AMS message comprising said audio message; creating a second AMS chat indicator; and transmitting said second AMS message and second AMS chat indicator.

An advantage of this is that the user may answer the received message with less user interaction.

The method of the above mentioned first aspect may further comprise: starting said recording; recording until a lower soundlevel is registered for a predetermined low sound level time or for a predetermined time; and stopping said recording.

An advantage with this is that the user may answer the received message with less user interaction.

The AMS chat session may comprise one or more sent or received audio messages, wherein said method further may comprise the steps of: storing said one or more sent or received audio messages; and presenting a set of items, wherein each item represents one of said audio messages. The item may comprise a time stamp, a sender indicator, a symbol, a text, an image, or an indication whether the represented audio message is received or sent, or any combination thereof.

An advantage of this is that a feasible chat log can be provided.

The above object is provided according to a second aspect of the present invention by a method for a audio messaging service (AMS) chat mobile communication terminal comprising: receiving a AMS chat indicator and a AMS message from one of one or several mobile communication terminals associated with a AMS chat session; and associating said AMS message to said AMS chat session.

An advantage with this second aspect of the invention is that the mobile communication terminal may be able to associate received AMS messages with correct AMS chat session, which improves the message handling.

The method of the above mentioned second aspect may further comprise: receiving a AMS chat request from an initiating mobile communication terminal of said associated mobile communication terminals; displaying an indication associated with said AMS chat request for a user of said associated mobile communication terminal; receiving an input from said user; and transmitting a AMS chat answer based on said input to said initiating mobile communication terminal.

An advantage of this is that the user of the receiving mobile communication terminal may have the possibility to accept or reject the invitation.

In the above mentioned second aspect of the invention, the AMS chat indicator may comprise a AMS chat session ID, and the method may further comprise: creating a new AMS chat session for every received new session ID.

An advantage of this is that several AMS chat sessions may be in progress simultaneously.

The method of the above mentioned second aspect may further comprise: selecting one or several of said sent AMS messages, said received messages from any of said one or several associated mobile communication terminal, or any combination of these for said AMS chat session; and presenting selected AMS messages.

An advantage of this is that a specific AMS message in said AMS chat session may be easier to find.

Another advantage of this is that the user may configure the AMS message presentation of said AMS chat according to his or her preferences.

The method of the above mentioned second aspect may further comprise: selecting one or several of said sent AMS messages, said received messages from any of said one or several associated mobile communication terminal, or any combination of these for said AMS chat session; and playing selected one or several AMS messages consecutively.

An advantage of this is that several AMS chat messages in a AMS chat session may be played with less user interaction and with fewer interruptions.

The method of the above mentioned second aspect may further comprise: selecting one or several of said sent AMS messages, or said received messages or any combination of these, from one of said one or several associated mobile communication terminals, for said AMS chat session; and deleting one or several sent AMS messages, received AMS messages, or a combination of these in said AMS chat session An advantage of this is that AMS messages in a AMS chat session may be deleted in an efficient way.

The method of the above mentioned second aspect may further comprise: entering a AMS chat session; selecting a mobile communication terminal; transmitting a AMS chat request associated with said AMS chat session to said selected mobile communication terminal; receiving an answer from said selected mobile communication terminal; and adding said selected mobile communication terminal to said AMS chat session if received said answer is positive.

An advantage of this is that the mobile communication terminal may invite a mobile communication terminal to join an existing AMS chat session.

The method of the above mentioned second aspect may further comprise: entering a AMS chat session; receiveing a AMS chat request from a mobile communication terminal; and adding said mobile communication terminal to said AMS chat session.

An advantage of this is that if a first mobile communication terminal participating in a first AMS chat session recieves a request to join a second AMS chat session from a second mobile communication terminal, the first mobile communication terminal may, instead of sending an answer to the received request, send a request to the second mobile communication to join the first AMS chat session. In this way it becomes easier to add new users to existing AMS chat sessions.

The method of the above mentioned second aspect may further comprise: entering a AMS chat session; and deleting an associated mobile communication terminal from said AMS chat session.

An advantage of this is that the mobile communication terminal may remove misbehaving participants from said AMS chat session.

The method of the above mentioned second aspect may further comprise: entering a AMS chat session; leaving said AMS chat session; and deleting AMS messages in said AMS chat session.

An advantage of this is that the memory handling of the mobile communication terminal may become more efficient. It is also an advantage that this is made automatically when leaving the AMS chat session, since this does not require any user interaction.

The method of the above mentioned second aspect may further comprise: entering a AMS chat session; leaving said AMS chat session; and storing said AMS chat session internally, or externally on a storing device, or a combination of these.

An advantage of this is that a AMS chat session may be saved for later use. The session may be saved internally in the memory of the mobile commmunication terminal, which may imply fast access, or the session may be saved externally, which may imply possibilities to store large amounts of data, or a link for each AMS message, describing the path to the rest of the AMS message may be stored internally and the rest of the messages may be stored externally on a server, which may imply fast access to a small part of each saved AMS message of the session, e.g. the headlines of the AMS messages, and a possibility to receive the AMS messages via the links.

The method of the above mentioned second aspect may further comprise: presenting existing AMS chat sessions; and selecting one or several of said AMS chat sessions to participate in.

An advantage of this is that the user may easily survey and choose among existing AMS chat sessions.

The above mentioned second aspect may further comprise: entering a AMS chat session; receiving a AMS message; playing said AMS message; and displaying an image associated with a sender from which said AMS message is sent.

An advantage of this is that a person with no reading skills may know from whom the AMS message is sent.

The method of the above mentioned second aspect may further comprise: determining a number of AMS messages in a AMS chat session; comparing said number of AMS messages in said AMS chat session with a maximum value of AMS messages in said AMS chat session; and deleting the first received, last received, first sent, or last sent AMS messages, or a combination of these in said AMS chat session until said number of AMS messages corresponds to said maximum value of AMS messages in said AMS chat session.

An advantage of this is that the memory of the mobile communication terminal is handled in an efficient way. Since the messages is deleted gradually the memory does not risk to run short.

The method of the above mentioned second aspect may further comprise: setting said maximum value of AMS messages.

An advantage of this is that the user may configure the settings according to his or her preferences.

The method of the above mentioned second aspect may further comprise: receiveing a first AMS message; entering a AMS playing mode automatically; and playing said first AMS message.

An advantage of this is that less user interaction is required, which is especially advantageous for users being busy with, e.g. driving a car.

The method of the above mentioned second aspect may further comprise: entering a AMS recording mode automatically; recording an audio message; creating a second AMS message associated with said audio message; and transmitting said second AMS message.

An advantage of this is that the user may answer the received message with less user interaction.

The method of the above mentioned second aspect may further comprise: starting said recording; recording until a lower soundlevel is registered for a predetermined low sound level time, or for a predetermined time, or a combination of these; and stopping said recording.

An advantage of this is that the user may answer the received message with less user interaction.

The AMS chat session may comprise one or more sent or received audio messages, wherein said method further may comprise the steps of: storing said one or more sent or received audio messages; and presenting a set of items, wherein each item represents one of said audio messages. The item may comprise a time stamp, a sender indicator, a symbol, a text, an image, or an indication whether the represented audio message is received or sent, or any combination thereof.

An advantage of this is that a feasible chat log can be provided.

The chat session may further comprise SMS (short message service), EMS (enhanced messaging service), or MMS (multimedia messaging service) messages, or any combination thereof. An advantage of this is that a very versatile chat application is provided.

The above object is provided according to a third aspect of the present invention by a mobile communication terminal comprising a receiver for receiving AMS chat messages; a user interface comprising an input for recording audio messages and for controlling an operation of said mobile communication terminal, and an output for outputting said received audio messages; a processor for processing said audio message to a AMS message, for executing a AMS chat application, and for generating a AMS chat message comprising a AMS chat indicator and said AMS message, and information regarding associated terminals; and a transmitter for transmitting said generated AMS chat message to said associated terminals.

The mobile communication terminal of the above third aspect may further comprise a memory for storing AMS chat messages.

An advantage of this is that the AMS chat messages are fast and easily accessed.

The memory may be of different flash memory types, such as Memory Stick, Compact Flash or Secure Digital, as well as a hard disc drive.

Another advantage of this is that the memory may contain links with a path to an external memory storage, such as a server, where the AMS chat messages are stored. In this way, several AMS chat messages may be saved without being out of memory. The AMS chat messages, saved on an external memory storage, may further easily being accessed by many different users.

The mobile communication terminal of the above third aspect may further comprise a speech detector for detecting if said user speaks, and for transferring a speech detection signal to said processor; and wherein said processor is arranged for receiving said speech detection signal.

An advantage of this is that the user may participate in a AMS chat session just by talking and listening, according to prior description.

The above object is provided according to a fourth aspect of the present invention by a system for handling an audio messaging service AMS chat session between mobile communication apparatuses via a mobile communication network, said system comprising means for handling point-to-point audio messaging service in said mobile communication network;
an AMS chat session handling server; and
a group of mobile communication apparatuses accessing said AMS chat session handling server, wherein
said mobile communication apparatuses are adapted to send a request for participating in an AMS chat session to said AMS chat session handling server, and
said AMS chat session handling server is arranged to provide an AMS message for the group of mobile communication apparatuses, to update the AMS message from members of the group of mobile communication apparatuses, and to transmit the updated AMS message to the group of mobile communication apparatuses participating in said chat session.

The above object is provided according to a fifth aspect of the present invention by a method for handling an audio messaging service AMS chat session between mobile communication apparatuses, comprising the steps of:
generating a list of mobile communication apparatuses to be invited to participate in said AMS chat session;
inputting an AMS message;
sending said AMS message to said mobile communication apparatuses on said list;
receiving a reply from one of said mobile communication appatatuses; and
transmitting said reply to at least the others of said mobile communication apparatuses.

BRIEF DESCRIPTION OF THE DRAWINGS

The above, as well as additional objects, features and advantages of the present invention, will be better understood through the following illustrative and non-limiting detailed description of preferred embodiments of the present invention, with reference to the appended drawings, wherein.

DETAILED DESCRIPTION OF THE PREFERRED EMBODIMENT

Figure 1:
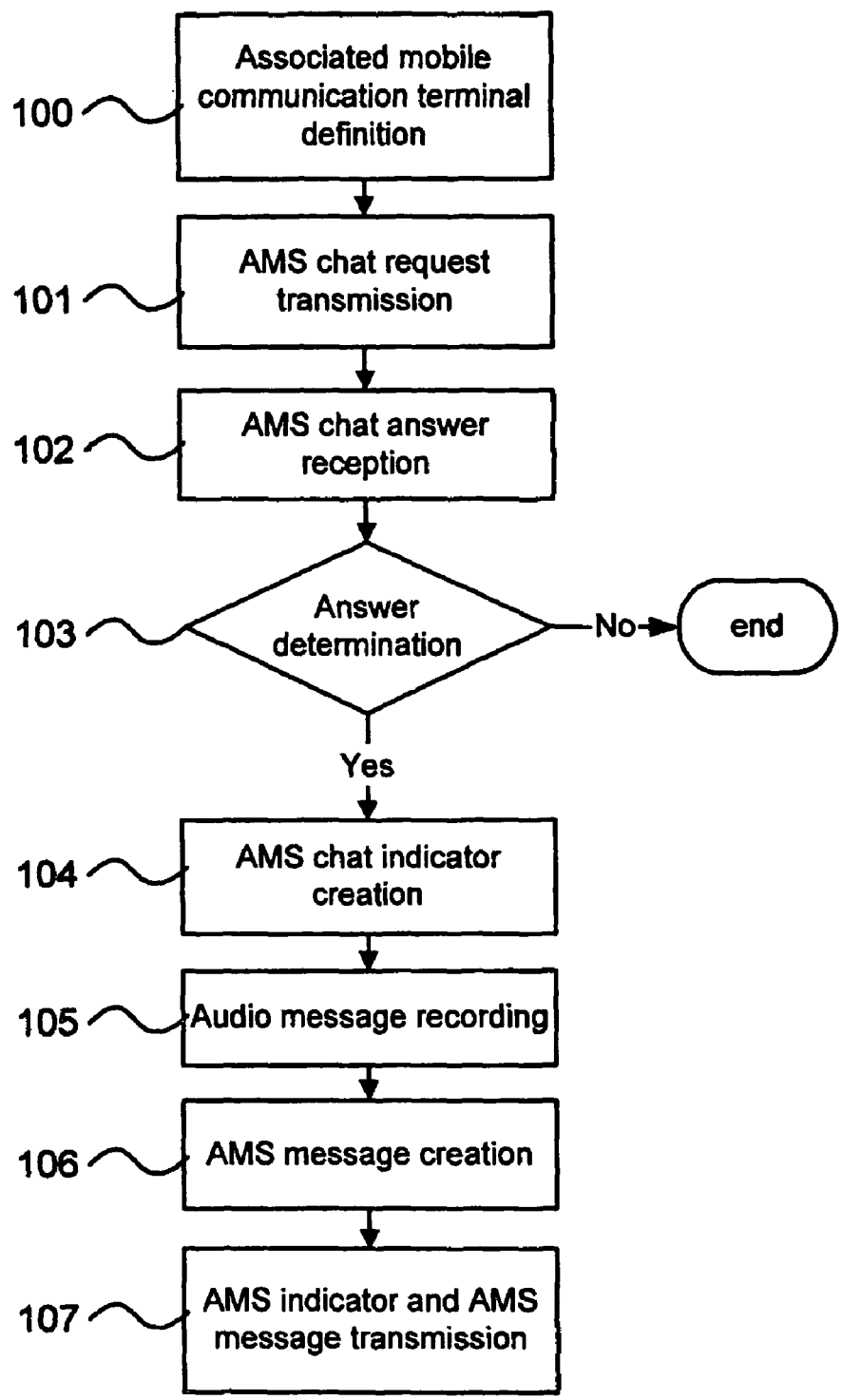
FIG. 1 is a flow chart of an embodiment of a method for the initiating process of a AMS chat session.

FIG. 1 is a flow chart illustrating a method of an embodiment of the present invention describing the initiating process of a AMS chat session. The process is inititiated by a mobile communication terminal, hereafter referred to as the initiating mobile communication terminal.

In a first associated mobile communication terminal defintion step 100, one or several mobile communication terminals are defined to participate in present forthcoming AMS chat session. These defined participants will be referred to as associated mobile communication terminals. This definition of associated mobile communication terminals can be made by inputting the number associated with the associated mobile communication terminals, or via a predetermined list.

Optionally, when the associated mobile communication terminals are defined a AMS chat request is transmitted to them in a AMS chat request transmission step 101. This request may be sent as an SMS, a AMS, a MMS, or any other message type supported by a mobile communication terminal. The answers to the requests are received by the initiating mobile communication terminal in a AMS chat answer reception step 102. The answers to these requests may be either positive or negative.

In an answer determination step 103, it is determined if the received answer(s) is/are positive or negative. If the answer is positive for an associated mobile communication terminal the process of this will continue to steps 104-107 for performing AMS chat, as will be described below, but if it is negative the process will end.

Next, in a AMS chat indicator creation step 104, a AMS chat indicator is created by the initiating mobile communication terminal. The AMS chat indicator is a small data set indicating to the receiving mobile communication terminal that a AMS chat message is incoming.

Next, in an audio message recording step 105, an audio message is recorded by the user of the initiating mobile communication terminal. Alternatively, this step could be made before the AMS chat indicator creation step 104, or at the same time.

Then, in a AMS message creation step 106, a AMS message is created based on said audio message. The audio message could, e.g. be attached to, incorporated in, converted to, compressed and attached to, or compressed and incorporated in the AMS message.

Thereafter, step 107, the AMS message and the AMS indicator is sent to all associated mobile communication terminals.

Figure 2:
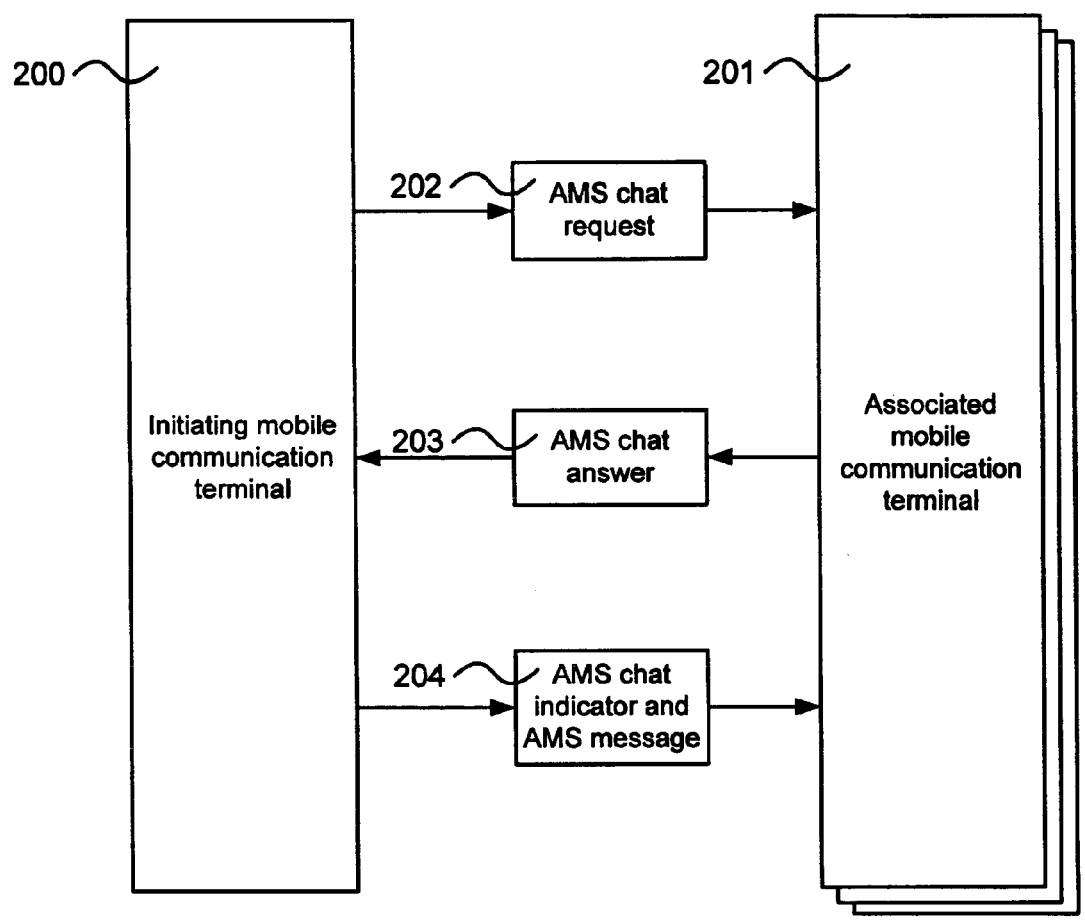
FIG. 2 schematically illustrates the communication between an initiating mobile communication terminal and an associated mobile communication terminal during an initiation of a AMS chat session.

FIG. 2 schematically illustrates the communication between an initiating mobile communication terminal 200 and an associated mobile communication terminal 201, which may be one of many associated mobile communication terminals. Optionally, the first step is that the initiating mobile communication terminal 200 sends a AMS chat request 202 to the associated mobile communication terminal 201, accordingly with step 101 in FIG. 1. Depending on the input from the user of the associated mobile communication terminal 201, or predetermined settings in the associated mobile communication terminal 201, a AMS chat answer 203 is/are sent from the associated mobile communication terminal(s) 201 to the initiating mobile communication terminal 200. If the AMS chat answer(s) 203 is/are positive, a AMS chat indicator and AMS message 204 is sent from the initiating mobile communication terminal 200 to the associated mobile communication terminal(s) 201.

Figure 3:
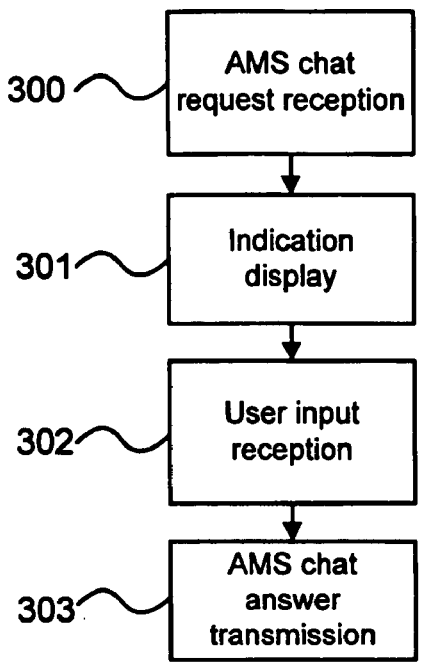
FIG. 3 is a flow chart of an embodiment of a method for the receiveing process of a AMS chat session.

FIG. 3 is a flow chart describing the receiving process of a AMS chat session.

Optionally, in a AMS chat request reception step 300, a AMS chat request is received. Thereafter, in an indication display step 301, an indication, e.g. in the form of a pop-up window on the display of the associated mobile communication terminal, is shown to the user of the associated mobile communication terminal. Then, an input from the user is received by the associated mobile communication terminal in a user input reception step 302. This user input may be positive or negative. The answer associated with the user input is sent in a AMS chat answer transmission step 303 to the initiating mobile communication terminal in the form of a AMS chat answer.

Figure 4:
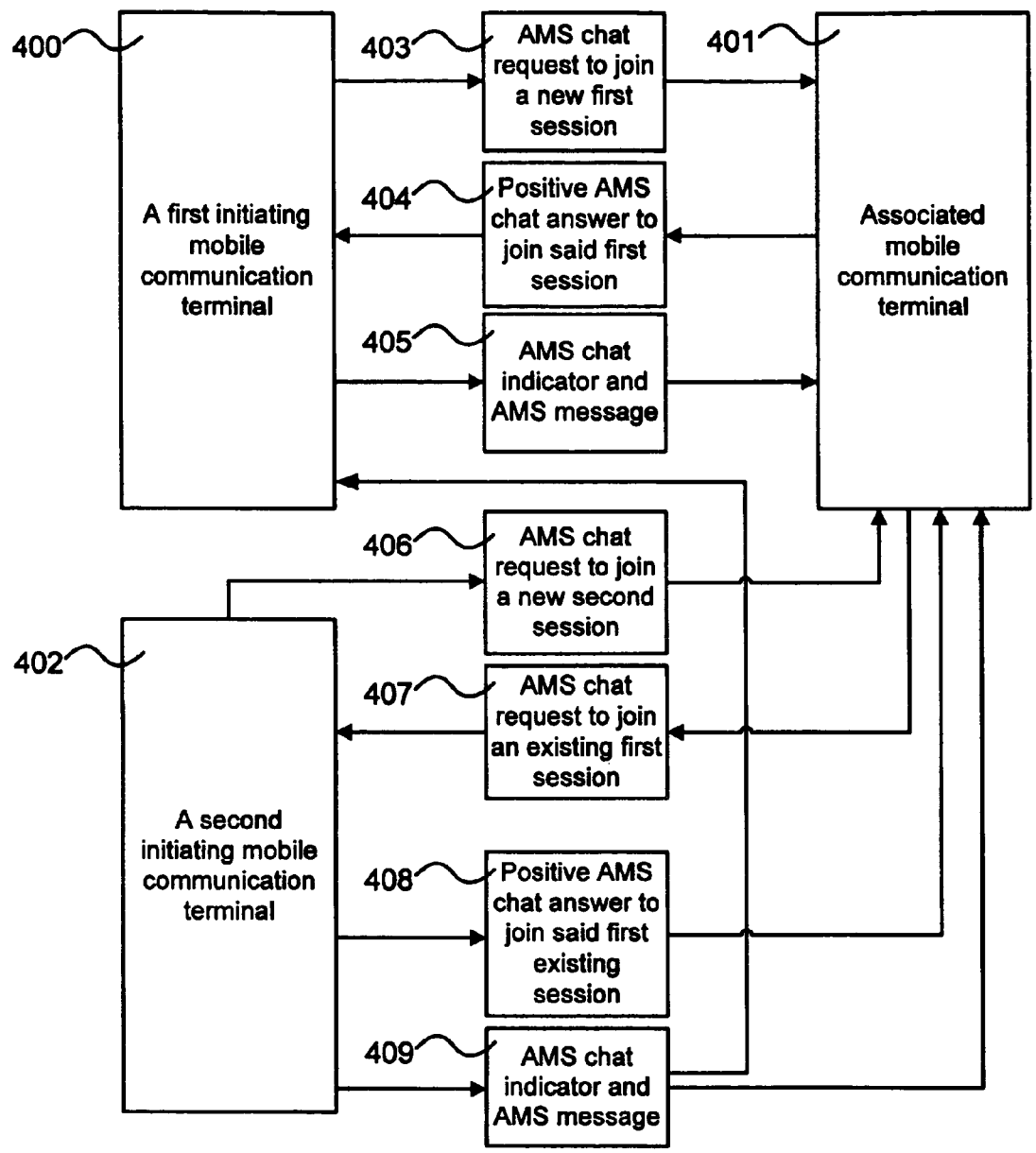
FIG. 4 schematically illustrates the communication between a first initiating mobile communication terminal and an associated initiating mobile communication terminal, and between a second initiating mobile communication terminal and said associated mobile communication terminal.

FIG. 4 schematically illustrates an example of a communication between a first initiating mobile communication terminal 400 and a first associated mobile communication terminal 401, and between a second initiating mobile communication terminal 402 and said first associated mobile communication terminal 401.

First a AMS chat request 403 to join a first AMS chat session is sent from the first initiating mobile communication terminal 400 to the first associated mobile communication terminal 401, thereafter, a positive AMS chat answer to join said first AMS chat session 404 is sent from the associated mobile communication terminal 401 to the first initiating mobile communication terminal 400, and thereafter a AMS chat indicator and AMS message 405 is sent from the first initiating mobile communication terminal 400 to the first associated mobile communication terminal 401. Thereby, a first AMS chat session is now established between the first initiating mobile communication terminal 400 and the first associated mobile communication terminal 401.

Second, a AMS chat request 406 to join a new second AMS chat session is sent by the second initiating mobile communication terminal 402 to the first associated mobile communication terminal 401.

Since the associated mobile communication terminal 401 already is participating in a AMS chat session, a AMS chat request to join this existing first AMS chat session 407 is sent to the second initiating mobile communication terminal 401, instead of sending a AMS chat answer which is also an alternative.

Third, the request is accepted by the second initiating mobile communication terminal 402 and a positive AMS chat answer 408 to join said first existing AMS chat session is sent to the first associated mobile communication terminal 401. Thereafter, a AMS chat indicator and AMS message 409 is sent from the second initiating mobile communication terminal 402 to the other participants in the first AMS chat session, namely the first initiating mobile communication terminal 400 and the associated mobile communication terminal 401.

The communication procedures described above, is only to be seen as an illustrative example. In this example only one associated mobile communication terminal is represented, but the same principles is also applicable on cases where several associated mobile communication terminals are represented.

Figure 5:
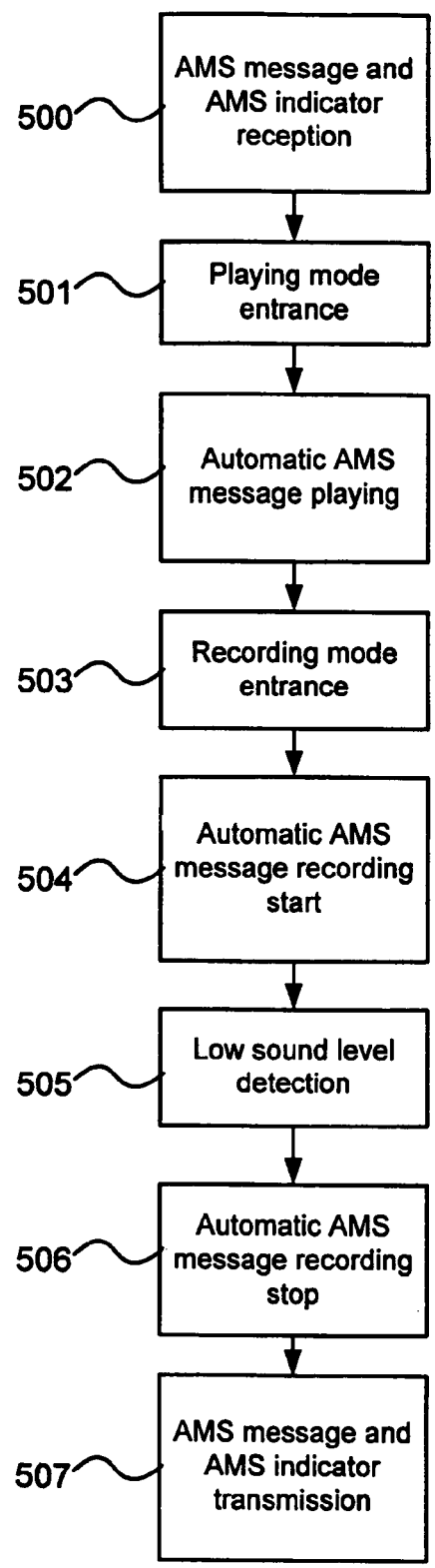
FIG. 5 is a flow chart of an embodiment of a method for playing a received AMS message automatically and recording an answer to said received message automatically.

FIG. 5 is a flow chart illustrating a method of an embodiment of the present invention describing an optional process for receiving and sending AMS messages and AMS indicators. In the first step, step 500, a AMS message and a AMS indicator is received by the mobile communication terminal. When receiving the AMS indicator, the mobile communication terminal knows that a AMS message is received.

Thereafter, step 501, a playing mode is entered by the mobile communication terminal and the AMS message is played automatically, without any user interaction being necessary, step 502. If the AMS indicator comprises a session ID, this functionality can be limited to certain AMS chat sessions, and if the sender is known, e.g. by phone number, this functionality can be limited to certain users as well, and if both session ID and sender is known this functionality can be limited by a combination of these two.

It is further possible to automatically, without any user interaction being necessary, continue the process by entering a AMS recording mode, step 503. The recording is started automatically, step 504.

When the recording is started a measurement of the sound level is started as well. If a lower sound level is detected, step 506, the recording is stopped. If no lower sound level is detected the recording is stopped after a certain maximum time. In this way the user of the mobile communication terminal only have to say the answer in the microphone of the mobile communication terminal, while the rest is made automatically.

Thereafter, a AMS chat indicator is created and the recorded AMS message and the created AMS chat indicator is transmitted to the sender of said received AMS message and AMS indicator, step 507.

Figure 6:
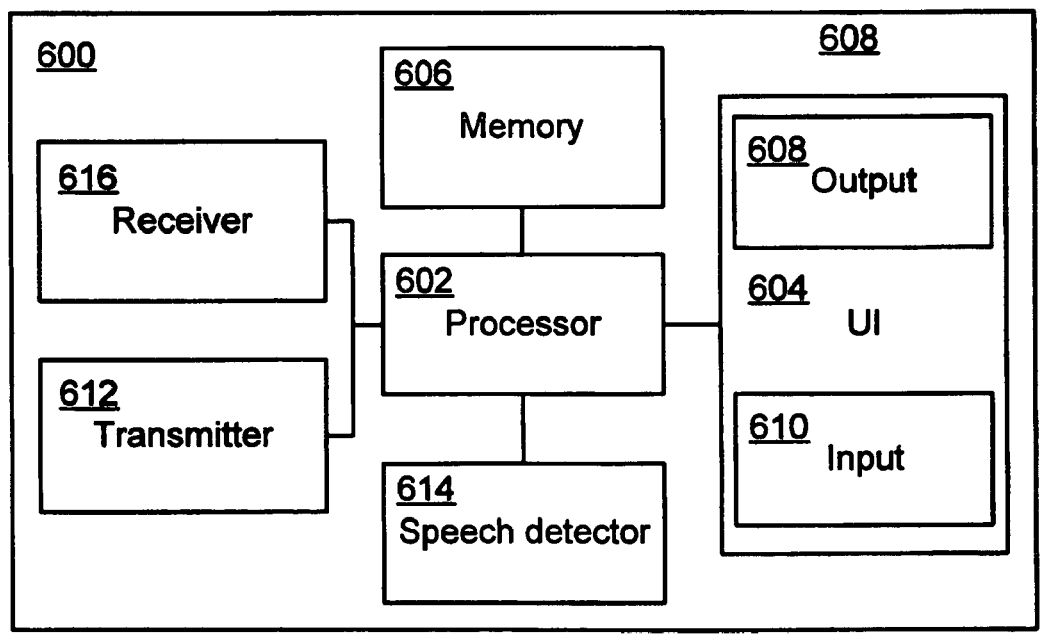
FIG. 6 illustrates schematically illustrates a mobile communication terminal.

FIG. 6 schematically shows a mobile communication apparatus 600 according to an embodiment of the present invention. It should be noted that parts not contributing to the core of the invention are left out not to obscure the features of the present invention. The mobile communication apparatus comprises a processor 602, a user interface (UI) 604, a memory 606, a transmitter 612, a receiver 616 and a speech detector 614.

The memory 606 holds program code for operation of applications of the mobile communication apparatus. The memory 606 also holds data used by the applications. Here, the memory 606 is depicted as a single unit. However, the memory can be two or more units, and/or divided in partitions. Preferably, program code for applications can be downloaded to the memory 606, and the downloaded program code can then be executed by the processor 602.

The user interface (UI) 604 comprises an input 610 and an output 608. The output 608 is arranged to present information to a user, such as audio output related to AMS messages, diplaying text and/or images related to AMS chat or the operation of AMS messages. The input 610 is arranged to receive input related to AMS chat requests, AMS chat answers, recording of audio messages, selecting among different AMS chat sessions and/or different AMS messages of a AMS chat session.

The transmitter 612 is arranged to transmit data and the receiver 616 is arranged to receive data to and from a mobile communication network, respectively.

The speech detector 614 is arranged to detect whether the user speaks or not. This detection can be achieved by comparing a filtered sound level in the microphone and comparing this sound level with a threshold. The filtering is made in order to reduce the affect of surrounding sounds and noise.

Figure 7:
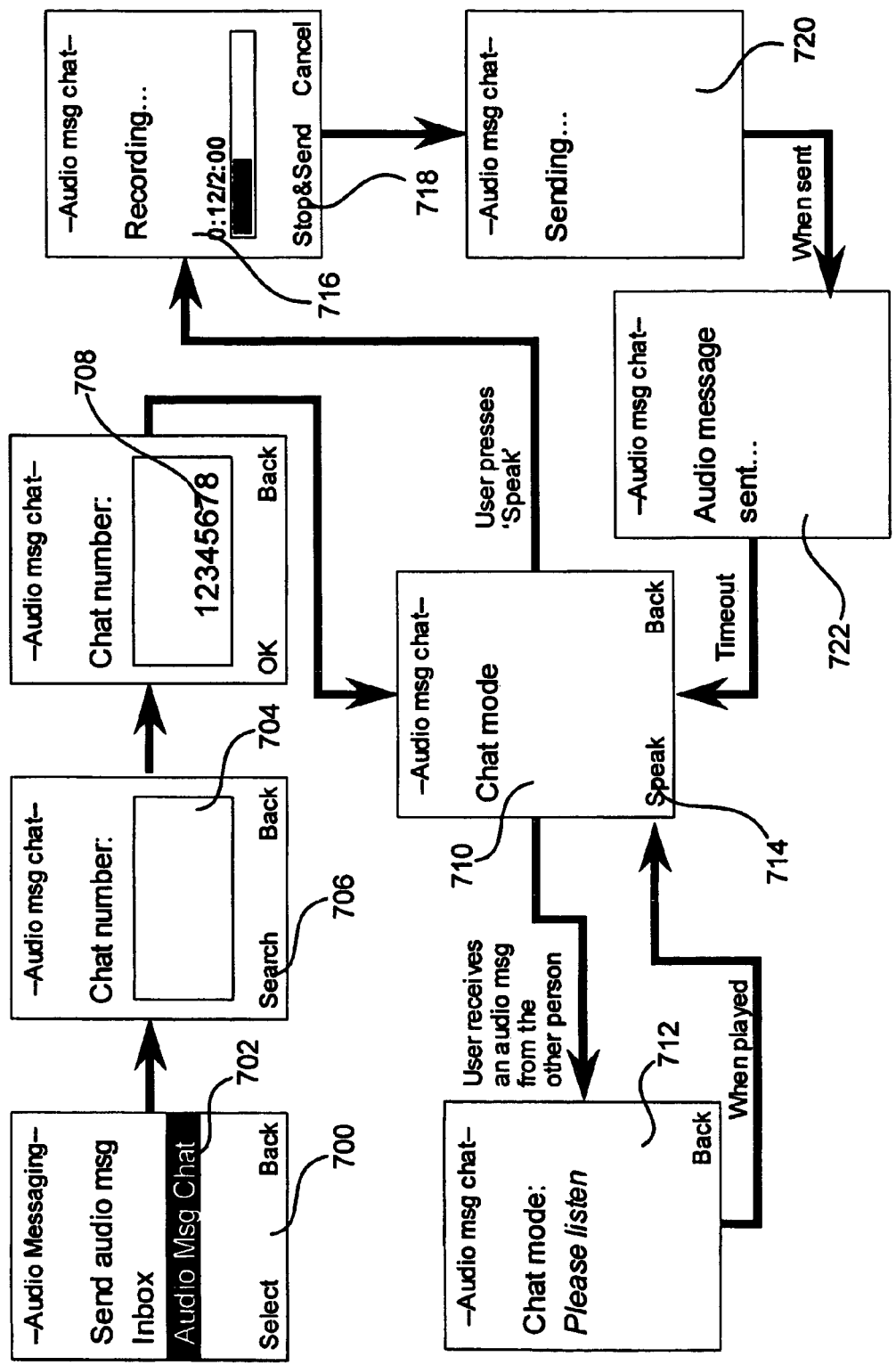
FIG. 7 illustrates an example how a user can experience a user interface UI of a mobile communication apparatus while using a AMS chat application according to an embodiment of the present invention.

FIG. 7 illustrates an example how a user can experience a user interface UI of a mobile communication apparatus while using a AMS chat application. When Audio messaging is chosen in a main menu or accessed by a short cut of the mobile communication apparatus, an audio messaging menu 700 is displayed to a user. The user can then choose Audio message chat 702 from the menu 700, and will then be prompted to input a chat number in an audio message chat prompt 704. The user can also choose to search for a chat by choosing 'Search' 706 in the prompt 704. When a chat is chosen, e.g. by inputting a chat number 708, a chat mode view 710 is presented. If an audio message is received, an indication 712 is presented to the user that an audio message is to be played. The playing of the audio message can start automatically, or the user can make a selection to start the playing of the audio message.

The user can select 'Speak' 714 in the chat mode view 710 to start recording 716 of an audio message. When the audio message is recorded, the user selects 'Stop & Send' 718 and the recorded audio message will be sent to the chat participants. A sending view 720 is presented to the user, and when the audio message is successfully sent, a confirmation view of successful sending 722 is presented to the user. Then, the chat mode view 710 will be presented to the user after a predetermined time timed out.

Figure 8:
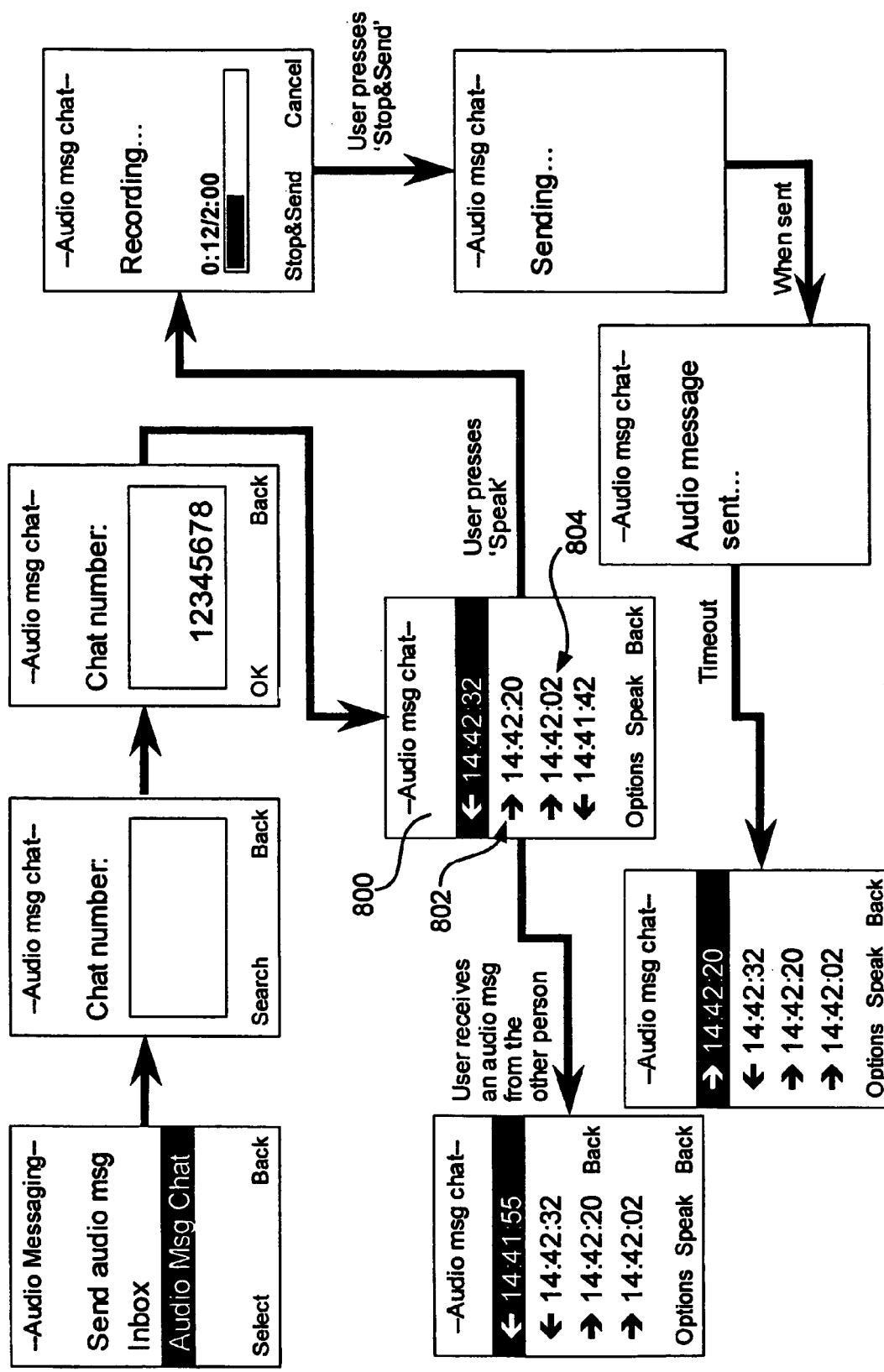
FIG. 8 illustrates an example how a user can experience a user interface UI of a mobile communication apparatus while using a AMS chat application according to an embodiment of the present invention.

FIG. 8 illustrates an example how a user can experience a user interface UI of a mobile communication apparatus while using a AMS chat application. A chat mode view 800 can comprise a chat log 802, showing a menu list of sent and received audio messages in the present chat session. The sent and received audio messages can also be presented as icons or other graphical representation of audio messages of the chat session. Preferably, each audio message in the log comprise a time stamp 804, and information who sent the audio message, e.g. simply showing if it was a incoming or outgoing audio message, in FIG. 8 presented by arrows, or showing an identification of the sender at each audio message item, by text, a symbol, or an image. The time stamp can be a time of day, e.g. according to the time zone of the initiator of the chat, or Zulu time, or a time related to the chat session, e.g. the time from the initiation of the chat session. The chat log is automatically updated when a new audio message is present in the chat session. The audio messages of the chat session is preferably presented in chronological order, e.g. with the latest audio message on top of the list.

The audio messages of the chat session are preferably stored in the mobile communication apparatus, as described above. To avoid memory overflow, the storage can be applied according to first-in first-out principle, where a user can set the number of audio messages to save, or the amount of memory to assign to storing audio messages related to the chat session.

Figure 9:
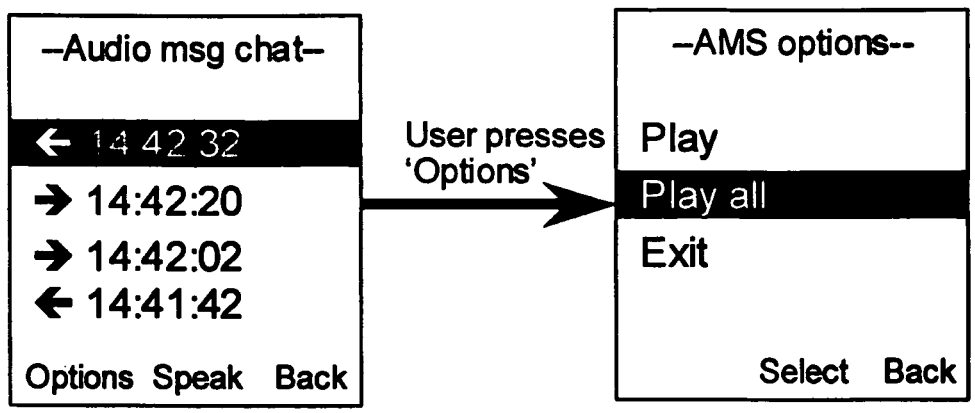
FIG. 9 illustrates an example how a user can experience a user interface UI of a mobile communication apparatus while using a AMS chat application according to an embodiment of the present invention.

FIG. 9 illustrates an example how a user can experience a user interface UI of a mobile communication apparatus while using a AMS chat application. A user can select to play an audio message of the chat session by selecting the audio message from the list of audio messages of the chat session. A user can also select to play all messages, or a selected sub-set of messages, in chronological order according to time stamp of the audio messages, to form a recall of a virtual conversation comprising audio messages of the chat session.

Figure 10:
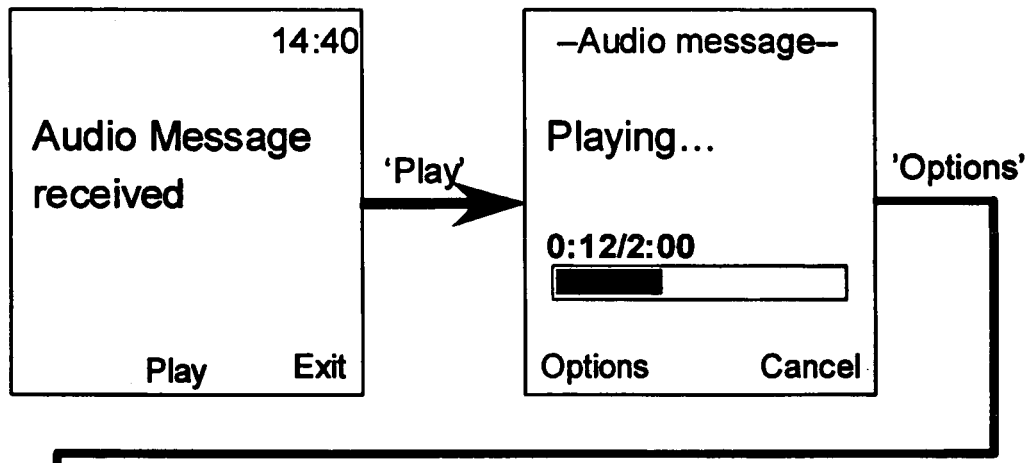
FIG. 10 illustrates an example how a user can experience a user interface UI of a mobile communication apparatus while using a AMS chat application according to an embodiment of the present invention.
Figure 10:
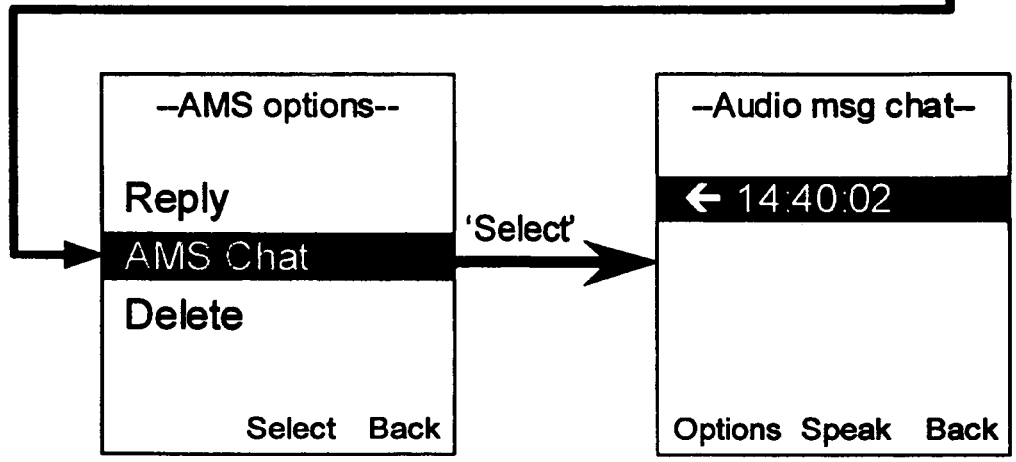

FIG. 10 illustrates an example how a user can experience a user interface UI of a mobile communication apparatus while using a AMS chat application. When a user receives an audio message that is not related to a present chat session, the user can use a shortcut to include the received audio message into the chat session, and preferably, the sender of the audio message to the participants of the chat session. The user can also choose to put the participation in the chat session to 'idle', and respond to the audio message separate from the chat session. The user can also choose to initiate a new second chat session with the person sending said received audio message, wherein the two chat sessions become independent on each other. Thereby, the user can toggle between the two chat sessions.

To provide a very versatile chat application, the chat session can also include messages according to short message services (SMS) enhanced messaging services, and multimedia messaging services (MMS).

Figure 11:
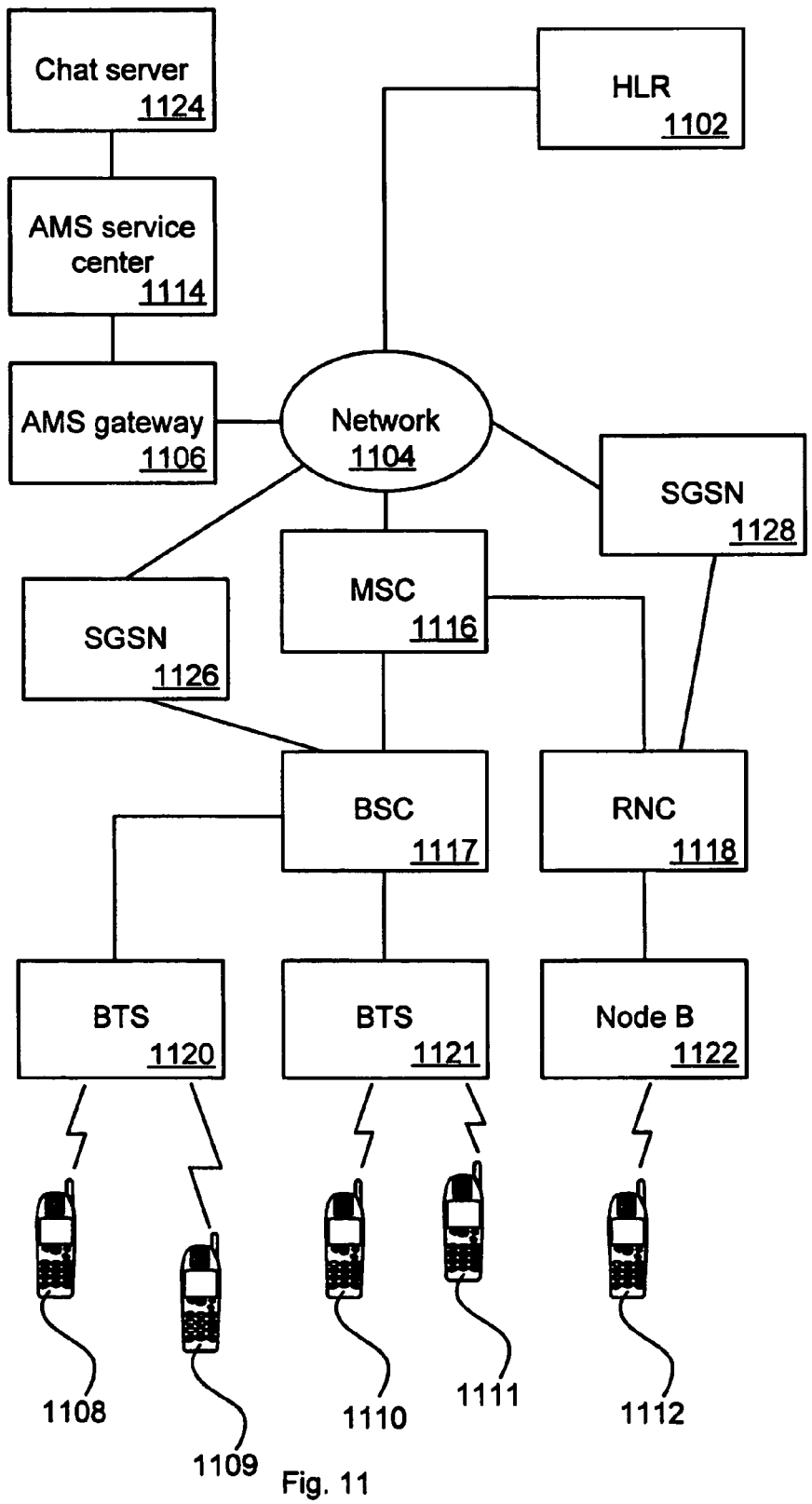
FIG. 11 illustrates a system for handling AMS chat according to an embodiment of the present invention.

A system architecture for managing a system 1100 according to an embodiment of the present invention is shown in FIG. 11. A Home Location Register (HLR) 1102 contains a database (not shown) including relevant subscriber information for provision of telecommunication service. A CCITT specified network 1104 interconnects the individual parts of the system 1100. An AMS gateway 1106 is a switching unit routing a message or a call to a mobile communication apparatus 1108-1112. An AMS Service Center 1114 (AMSC) and the AMS gateway 1106 handles and routes the AMS's between the AMSC 1114 and the network 1104. From the network 1104, the AMS messages are routed to the mobile communication apparatuses 1108-1112 via a Mobile Switching Center (MSC) 1116 to a Base Station Controller (BSC) 1117 and a Base Transceiver Station (BTS) 1120, 1121, or a Radio Network Controller (RNC) 1118 and a Node B 1122. Alternatively, the AMS messages are routed to the mobile communication apparatuses 1108-1112 via a Serving GPRS Support Node (SGSN) 1126, 1128 to the BSC 1117 and the BTS 1120, 1121, or the RNC 1118 and the Node B 1122, respectively. The BTS 1120, 1121 or the Node B 1122 establish the air connection to the mobile communication apparatuses 1108-1112.

According to an embodiment of the present invention, a network operator or other third party company handling a chat server 1124 could offer a chat function between persons not knowing each other. For example a network operator may have a chat server 1124 supporting a feature where the user may send a chat request from his mobile communication apparatus 1108-1112 to the chat server 1124 by using a special phone number. This chat server 1124 automatically places people sending a similar request message to the chat server 1124 into "chat groups" or "chat rooms". Whenever a user, being part of such a group, sends a message to the chat server 1124, the chat server 1124 adds the audio message 'on top' of the previous communication in the chat group and forwards the up-dated communication in an AMS message to all the other persons in the group. The chat server 1124 is responsible for the distribution of the AMS messages and the distribution lists.

Figure 12:
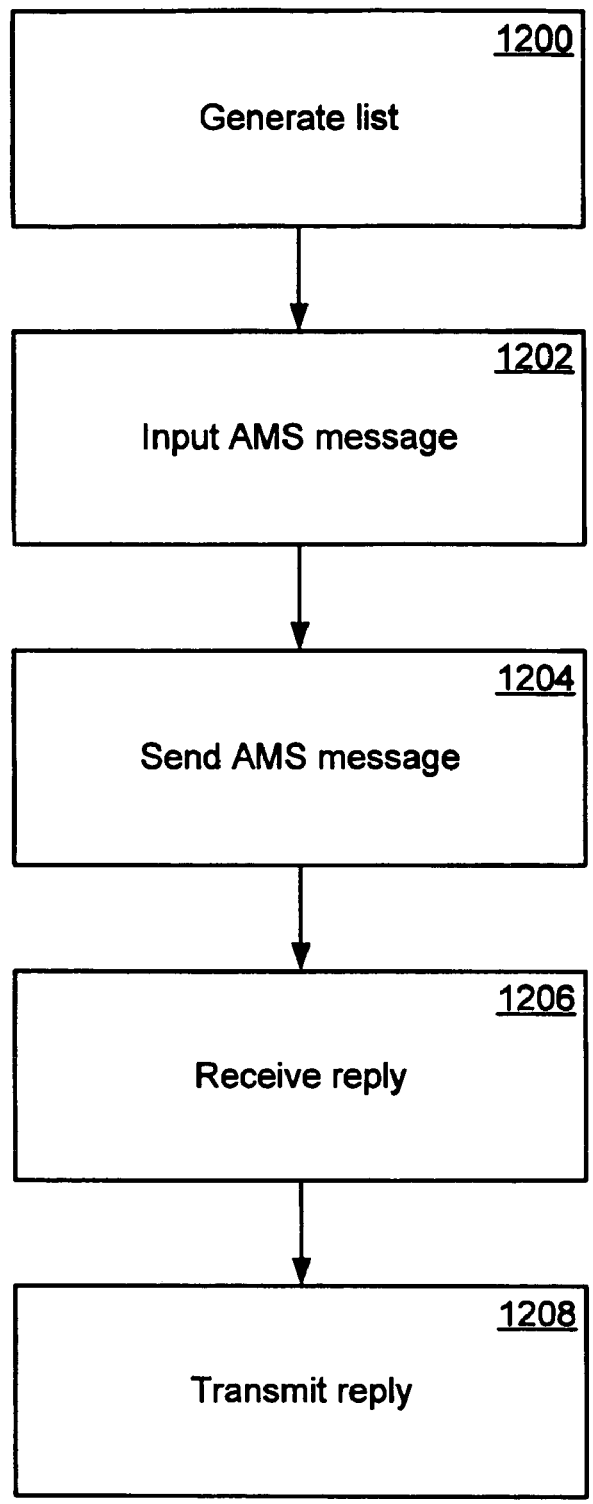
FIG. 12 is a flow chart illustrating a method for handling an AMS chat session.

FIG. 12 is a flow chart illustrating a method for handling an AMS chat session between mobile communication apparatuses from a system point of view. In a list generation step 1200, a list of mobile communication apparatuses to be invited to participate in the chat session is generated. For example, the mobile communication apparatuses can be determined from prior requests received from the mobile communication apparatuses to participate in a chat session, i.e. from the users of the mobile communication apparatuses. An AMS message is input in an AMS message input step 1202, and the AMS message is then sent to the participants in an AMS message sending step 1204, i.e. to the mobile communication apparatuses in the generated list. A participant may send a reply, and then is a reply received in a reception step 1206. The AMS message of the reply is then sent to the other participants of the chat session in a reply transmission step 1208. Every received reply is then treated the same way as long as the chat session goes on.

The invention claimed is:

1. A method for an audio messaging service (AMS) chat initiating mobile communication terminal comprising:
   transmitting a first AMS chat request from a chat initiating mobile communication terminal to at least one associated mobile communication terminal, said first AMS chat request relating to a first chat session;
   receiving a second AMS chat request associated with an existing AMS chat session at the chat initiating mobile communication terminal from said at least one associated mobile communication terminal, wherein said existing AMS chat session is different to said first chat session that relates to said first AMS chat request;
   transmitting an AMS chat answer in response to said second AMS chat request from said chat initiating mobile communication terminal to said at least one associated mobile communication terminal, and if the AMS chat answer is positive, said chat initiating mobile communication terminal:
      entering said existing AMS chat session;
      creating an AMS chat indicator;
      recording an audio message;
      creating an AMS message associated with said audio message; and
      transmitting said AMS chat indicator and said AMS message to mobile communication terminals associated with said AMS chat session.

2. The method according to claim 1, wherein said AMS chat indicator comprises an AMS chat session ID, and further comprising:
   creating a new AMS chat session for every new session ID.

3. The method according to claim 1, further comprising:
   selecting sent AMS messages, or received AMS messages or any combination thereof, from one of said one or several associated mobile communication terminals, for said AMS chat session; and
   presenting selected one or several AMS messages.

4. The method according to claim 1, further comprising:
   selecting a plurality of sent AMS messages, or received AMS messages or any combination of these, from one of said one or several associated mobile communication terminals, for said AMS chat session; and
   playing said selected plurality of AMS messages in said AMS chat session consecutively.

5. The method according to claim 1, further comprising:
   selecting one or several sent AMS messages, or received AMS messages or any combination of these, from one of said one or several associated mobile communication terminals, for said AMS chat session; and
   deleting selected AMS messages.

6. The method according to claim 1, further comprising:
   entering an existing AMS chat session;
   transmitting a AMS chat request concerning said AMS chat session to a mobile communication terminal;
   receiving an answer from said mobile communication terminal; and
   adding said mobile communication terminal to said existing AMS chat session if said received answer is positive.

7. The method according to claim 1, further comprising:
   deleting an associated mobile communication terminal from said AMS chat session.

8. The method according to claim 1, further comprising:
   leaving said AMS chat session; and
   deleting AMS messages associated with said AMS chat session.

9. The method according to claim 1, further comprising:
   leaving said AMS chat session; and
   saving said AMS chat session internally, or externally on an external storing device, or a combination thereof.

10. The method according to claim 1, further comprising:
    presenting existing AMS chat sessions; and
    selecting one or several of said AMS chat sessions to participate in.

11. The method according to claim 1, further comprising:
    receiving an AMS message;
    playing said AMS message; and
    displaying an image associated with the sender of said AMS message.

12. The method according to claim 1, further comprising:
    determining a time for an AMS chat session to be held; and
    transmitting said time to an associated mobile communication terminal.

13. The method according to claim 1, further comprising:
    determining a number of AMS messages in an AMS chat session;
    comparing said number of AMS messages in said AMS chat session with a maximum number of AMS messages in said AMS chat session; and
    deleting the first received, last received, first sent, or last sent AMS messages, or a combination thereof in said AMS chat session until said number of AMS messages corresponds to said maximum number of AMS messages in said AMS chat session.

14. The method according to claim 13, further comprising: setting said maximum number of AMS messages.

15. The method according to claim 1, further comprising:
receiving a first AMS message;
entering an AMS playing mode automatically; and
playing said first AMS message.

16. The method according to claim 15, further comprising:
entering an AMS recording mode automatically;
recording an audio message;
creating a second AMS message comprising said audio message; and
transmitting said second AMS message.

17. The method according to claim 16, wherein said recording comprises:
starting said recording;
recording until a lower sound level is registered for a low sound level time or for a maximum time, or a combination thereof; and
stopping said recording.

18. The method according to claim 1, wherein said AMS chat session comprises one or more sent or received audio messages, wherein said method further comprises the steps of:
storing said one or more sent or received audio messages; and
presenting a set of items, wherein each item represents one of said audio messages.

19. The method according to claim 18, wherein said item comprises a time stamp, a sender indicator, a symbol, a text, an image, or an indication whether the represented audio message is received or sent, or any combination thereof.

20. A computer program arranged to perform the method according to claim 1 when downloaded into and run on a mobile communication terminal.

21. The method according to claim 1, wherein the first AMS chat request relates to a new chat session.

22. A method for an audio messaging service (AMS) chat mobile communication terminal comprising:
receiving a first AMS chat request at a chat mobile communication terminal from an initiating mobile communication terminal, said first AMS chat request relating to a first chat session;
transmitting a second AMS chat request associated with an existing AMS chat session from said chat mobile communication terminal to said initiating mobile communication terminal, wherein said existing AMS chat session is different to said first chat session that relates to said first AMS chat request;
receiving an AMS chat answer in response to said second AMS chat request at said chat mobile communication terminal from said initiating mobile communication terminal, and if the AMS chat answer is positive, said chat mobile communication terminal:
receiving an AMS chat indicator and an AMS message from the initiating mobile communication terminals; and
associating said AMS message to said existing AMS chat session.

23. The method according to claim 22, further comprising:
displaying an indication associated with said first AMS chat request for a user of said associated mobile communication terminal;
receiving an input from said user; and
transmitting the second AMS chat request to said initiating mobile communication terminal based on said input.

24. The method according to claim 22, wherein said AMS indicator comprises a session ID, the method further comprising:
creating a new AMS chat session for every received new session ID.

25. The method according to claim 22, further comprising:
selecting one or several of said sent AMS messages, said received messages from any of said one or several associated mobile communication terminal, or any combination thereof for said AMS chat session; and
presenting selected AMS messages.

26. The method according to claim 22, further comprising:
selecting one or several of said sent AMS messages, said received messages from any of said one or several associated mobile communication terminal, or any combination of these for said AMS chat session; and
playing selected one or several AMS messages consecutively.

27. The method according to claim 22, further comprising:
selecting one or several of said sent AMS messages, or said received messages or any combination of these, from one of said one or several associated mobile communication terminals, for said AMS chat session; and
deleting said selected AMS messages.

28. The method according to claim 22, further comprising:
entering an AMS chat session;
selecting a mobile communication terminal;
transmitting an AMS chat request associated with said AMS chat session to said selected mobile communication terminal;
receiving an answer from said selected mobile communication terminal; and
adding said selected mobile communication terminal to said AMS chat session if received said answer is positive.

29. The method according to claim 22, further comprising:
entering a first AMS chat session;
receiving an AMS chat request to join a second AMS chat session from a mobile communication terminal;
transmitting an AMS chat request to join said first AMS chat session; receiving an AMS chat answer from said mobile communication terminal; and
adding said mobile communication terminal to said AMS chat session if said AMS chat answer is positive.

30. The method according to claim 22, further comprising:
entering an AMS chat session; and
deleting an associated mobile communication terminal from said AMS chat session.

31. The method according to claim 22, further comprising:
entering an AMS chat session;
leaving said AMS chat session; and
deleting AMS messages in said AMS chat session.

32. The method according to claim 22, further comprising:
entering an AMS chat session;
leaving said AMS chat session; and
saving said AMS chat session internally, or externally on an external storing device, or a combination thereof.

33. The method according to claim 22, further comprising:
presenting existing AMS chat sessions; and
selecting one or several of said AMS chat sessions to participate in.

34. The method according to claim 22, further comprising:
entering an AMS chat session;
receiving an AMS message;
playing said AMS message; and
displaying an image associated with a sender from which said AMS message is sent.

35. The method according to claim 22, further comprising:
determining a number of AMS messages in a AMS chat session;
comparing said number of AMS messages in said AMS chat session with a maximum number of AMS messages in said AMS chat session; and
deleting the first received, last received, first sent, or last sent AMS messages, or a combination thereof in said AMS chat session until said number of AMS messages corresponds to said maximum number of AMS messages in said AMS chat session.

36. The method according to claim 35, further comprising:
setting said maximum number of AMS messages.

37. The method according to claim 22, further comprising:
receiving a first AMS message;
entering a AMS playing mode automatically; and
playing said first AMS message.

38. The method according to claim 37, further comprising:
entering an AMS recording mode automatically;
recording an audio message;
creating a second AMS message associated with said audio message; and transmitting said second AMS message.

39. The method according to claim 38, wherein said recording comprises:
starting said recording;
recording until a low sound level is registered for a low sound level time, or for a maximum time, or a combination thereof; and
stopping said recording.

40. The method according to claim 22, wherein said AMS chat session comprises one or more sent or received audio messages, wherein said method further comprises the steps of:
storing said one or more sent or received audio messages;
presenting a set of items, wherein each item represents one of said audio messages.

41. The method according to claim 40, wherein said item comprises a time stamp, a sender indicator, a symbol, a text, an image, or an indication whether the represented audio message is received or sent, or any combination thereof.

42. The method according to claim 22, wherein said chat session further comprises SMS, EMS or MMS messages, or any combination thereof.

43. A computer program arranged to perform the method according to claim 22 when downloaded into and run on a mobile communication terminal.

44. The method according to claim 22, wherein the first AMS chat request relates to a new chat session.

45. An apparatus configured to:
provide for transmission of a first AMS chat request from a mobile communication terminal to at least one associated mobile communication terminal, said first AMS chat request relating to a first chat session;
provide for reception of a second AMS chat request associated with an existing AMS chat session at said mobile commercial terminal from said at least one associated mobile communication terminal, wherein said existing AMS chat session is different to said first chat session that relates to said first AMS chat request;
provide for transmission of an AMS chat answer in response to said second AMS chat request from said mobile communication terminal to said at least one associated mobile communication terminal; and
generate an AMS chat message comprising an AMS chat indicator and a recorded audio message for mobile communication terminals associated with said existing AMS chat session, if the second AMS chat answer is positive.

46. The apparatus according to claim 45, wherein the apparatus is a processor.

47. A mobile communication terminal comprising:
a user interface comprising an input configured to record audio messages, and an output configured to output said received audio messages;
the apparatus of claim 45; and
a transmitter configured to transmit said generated AMS chat message to said associated terminals.

48. The mobile communication terminal according to claim 47, further comprising
a memory for storing AMS chat messages.

49. The mobile communication terminal according to claim 47, further comprising
a speech detector for detecting if said user speaks, and for transferring a speech detection signal to said processor; and
wherein said processor is arranged for receiving said speech detection signal.

50. The apparatus according to claim 45, wherein the first AMS chat request relates to a new chat session.

51. Apparatus for a mobile communication terminal, the apparatus configured to:
receive a first AMS chat request at a mobile communication terminal from an initiating mobile communication terminal, said first AMS chat request relating to a first chat session;
provide for transmission of a second AMS chat request associated with an existing AMS chat session from said mobile communication terminal to said initiating mobile communication terminal, wherein said existing AMS chat session is different to said first chat session that relates to said first AMS chat request;
provide for reception of an AMS chat answer in response to said second AMS chat request at said chat mobile communication terminal from said initiating mobile communication terminal; and
if said AMS chat answer is positive, provide for reception of an AMS chat indicator and an AMS message at said mobile communication terminal from said initiating mobile communication terminal, and associate said AMS message to said existing AMS chat session.

52. The apparatus according to claim 51, wherein the apparatus is a processor.

53. A mobile communication terminal comprising the apparatus according to claim 51.

54. The apparatus according to claim 51, wherein the first AMS chat request relates to a new chat session.

* * * * *